US008990065B2

(12) United States Patent
Raskino et al.

(10) Patent No.: US 8,990,065 B2
(45) Date of Patent: Mar. 24, 2015

(54) AUTOMATIC STORY SUMMARIZATION FROM CLUSTERED MESSAGES

(75) Inventors: David Arthur Raskino, Kirkland, WA (US); Matthew Bret MacLaurin, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 647 days.

(21) Appl. No.: 13/004,083

(22) Filed: Jan. 11, 2011

(65) Prior Publication Data
US 2012/0179449 A1 Jul. 12, 2012

(51) Int. Cl.
G06F 17/28 (2006.01)
G06F 17/30 (2006.01)
(52) U.S. Cl.
CPC .............................. G06F 17/30719 (2013.01)
USPC .............. 704/2; 704/7; 704/8; 704/9; 704/10
(58) Field of Classification Search
USPC ...................................................... 704/2–10
See application file for complete search history.

(56) References Cited

U.S. PATENT DOCUMENTS

| 6,961,954 | B1 * | 11/2005 | Maybury et al. ................. 725/53 |
| 7,158,966 | B2 | 1/2007 | Brill et al. |
| 7,685,265 | B1 | 3/2010 | Nguyen et al. |
| 7,765,574 | B1 * | 7/2010 | Maybury et al. ............... 725/105 |
| 2002/0049727 | A1 * | 4/2002 | Rothkopf ........................... 707/1 |
| 2002/0051077 | A1 * | 5/2002 | Liou et al. ...................... 348/465 |
| 2003/0198921 | A1 * | 10/2003 | Ueda .............................. 434/156 |
| 2005/0273499 | A1 | 12/2005 | Goodman et al. |
| 2007/0255742 | A1 | 11/2007 | Perez et al. |
| 2007/0260695 | A1 * | 11/2007 | Fenton .......................... 709/207 |
| 2008/0040387 | A1 | 2/2008 | Schwartz et al. |
| 2008/0104061 | A1 | 5/2008 | Rezaei |
| 2010/0083124 | A1 | 4/2010 | Druzgalski et al. |
| 2011/0218946 | A1 | 9/2011 | Stern et al. |
| 2011/0246463 | A1 * | 10/2011 | Carson et al. ................. 707/737 |
| 2012/0101965 | A1 | 4/2012 | Hennig |

OTHER PUBLICATIONS

Ramage; et al., "Characterizing Microblogs with Topic Models"—Published Date: 2010, Association for the Advancement of Artificial Intelligence, http://nlp.stanford.edu/pubs/twitter-icwsm10.pdf.

* cited by examiner

*Primary Examiner* — Leonard Saint Cyr
(74) *Attorney, Agent, or Firm* — Dan Choi; Judy Yee; Micky Minhas

(57) ABSTRACT

A set of stories may be related in a set of messages (e.g., news articles, weblog posts, or messages exchanged in a social network). Presented herein are techniques for automatically generating a summary of respective stories that may be used as a headline or title. These techniques involve identifying the entities referenced in each message, clustering the messages based on similarly referenced entities to generate a cluster of messages associated with each story, and identifying facts of the story that appear in many of the messages, which may be used to generate a perspective-independent summary of the story. Additionally, metadata regarding each message may be detected (e.g., the entities involved in each story, a meta-story of the story, and the perspective of the author in relating the story), and may be used to fulfill requests to filter the set of stories and/or messages based on these criteria.

20 Claims, 8 Drawing Sheets

AUTOMATIC STORY SUMMARIZATION FROM CLUSTERED MESSAGES

BACKGROUND

Within the field of computing, many scenarios involve a set of stories related in one or more messages. As a first example, breaking news may be covered by several news outlets, each of which may generate a stream of articles summarizing the news stories. As a second example, a set of events occurring within a community may be described in blog posts among the members of the community. As a third example, a group of friends may post messages within a social network describing various stories arising within the group. In these and other scenarios, the stories may be automatically aggregated into a story feed; e.g., a news server may be configured to retrieve the messages generated by a set of message sources (e.g., one or more news outlets) relating a set of stories, and to present the retrieved messages as an aggregated news feed.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In scenarios involving an automated retrieval of messages from various message sources that present one or more stories, different message sources (such as authors or news outlets) may report the facts of a particular story in different ways. For example, the facts of the story may be related haphazardly within messages describing the story; e.g., a commentary on a particular story may allude to some facts throughout the narrative, but may not relate the entire story in a cohesive manner. An update or commentary on a story may also link or refer to another message that describes a story, and may add facts to the story, but may not recapitulate the original facts of the story. Additionally, the facts may be related in different ways based on the perspective of the author in reporting the story; e.g., authors writing from different political backgrounds may use very different terminology and phrasing to cover the same news story. As yet another example, different message sources may cover a news story in different languages, such as different cultural languages (e.g., English and Spanish), different literacy levels, different tone (e.g., a formal report of a story and a colloquial eyewitness report), or different target audiences (e.g., a medical study reported in a scientific journal and a popular description of the same study).

In order to provide readers with a summary of a story, it may be desirable to develop an automated technique for summarizing a particular story. An automated technique may be able to extract cohesive summaries of stories without bias, and may scale to handle a large volume and rate of messages. However, it may be difficult for an automated technique to extract all of the relevant facts of a story from a particular message, which may omit some facts, or may describe some facts in an ambiguous or unusual manner that is difficult to recognize in an automated manner. This difficulty may be overcome by summarizing each stories based on all of the messages that relate the story. For example, while different authors may use different terminology or language to describe a particular story, an automated evaluation may identify a set of terms or phrases that often arise within messages about the story, and may generate a summary of the story using such frequently arising terms and phrases. It may therefore be desirable to devise an automated summarizing technique that includes a clustering of messages about a particular story, and that evaluates all such messages together to identify the basic facts of the story and to generate a summary from such basic facts. Moreover, it may be desirable to design such automated techniques in an extensible manner, e.g., in a manner that allows an adjustment of the summarizing process for a particular set of messages, and the introduction of new processing techniques.

Presented herein are techniques for automatically extracting the facts of a story in order to provide readers with a cohesive, unbiased summary of the story. In accordance with these techniques, an automated message processing technique may evaluate a set of messages, and may cluster the messages based on the stories that are related in such messages. For a particular story, all of the messages relating to the story may be evaluated together, the entities, facts, and phrases that appear frequently in such messages may be extracted as a summary of the story. The summary may be utilized, e.g., as a headline or title of the story; may be presented with messages associated with the story to provide additional context; and/or may facilitate searches for messages associated with a particular story, topic, or political, sociological, religious, and/or philosophical perspective. Additionally, the summaries generated from the facts of the stories may be language- and perspective-independent, and the automated generation may scale well to summarize a large number of stories related in a large volume of messages (e.g., millions of messages presented in a social network on a particular day).

Additionally, the processing techniques presented herein may be devised as an architecture comprising message processing pipeline, e.g., wherein each message is subjected to a series of processing components, each configured to transform the message, identify concepts within the message, and/or extract particular facts from the message that may be included in the summary of the story. Implementing the message processing techniques presented herein as a message processing pipeline may promote the adjustment of the evaluation in view of different message sources (e.g., choosing a first message processing pipeline using a first series of components for a first message source, such as a formal news source, and a second message processing pipeline using a different series of components for a second message source, such as a colloquial personal weblog), and may facilitate the customization of message processing with custom processing components (e.g., a particular language component to translate slang phrases that frequently arise within a particular community).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
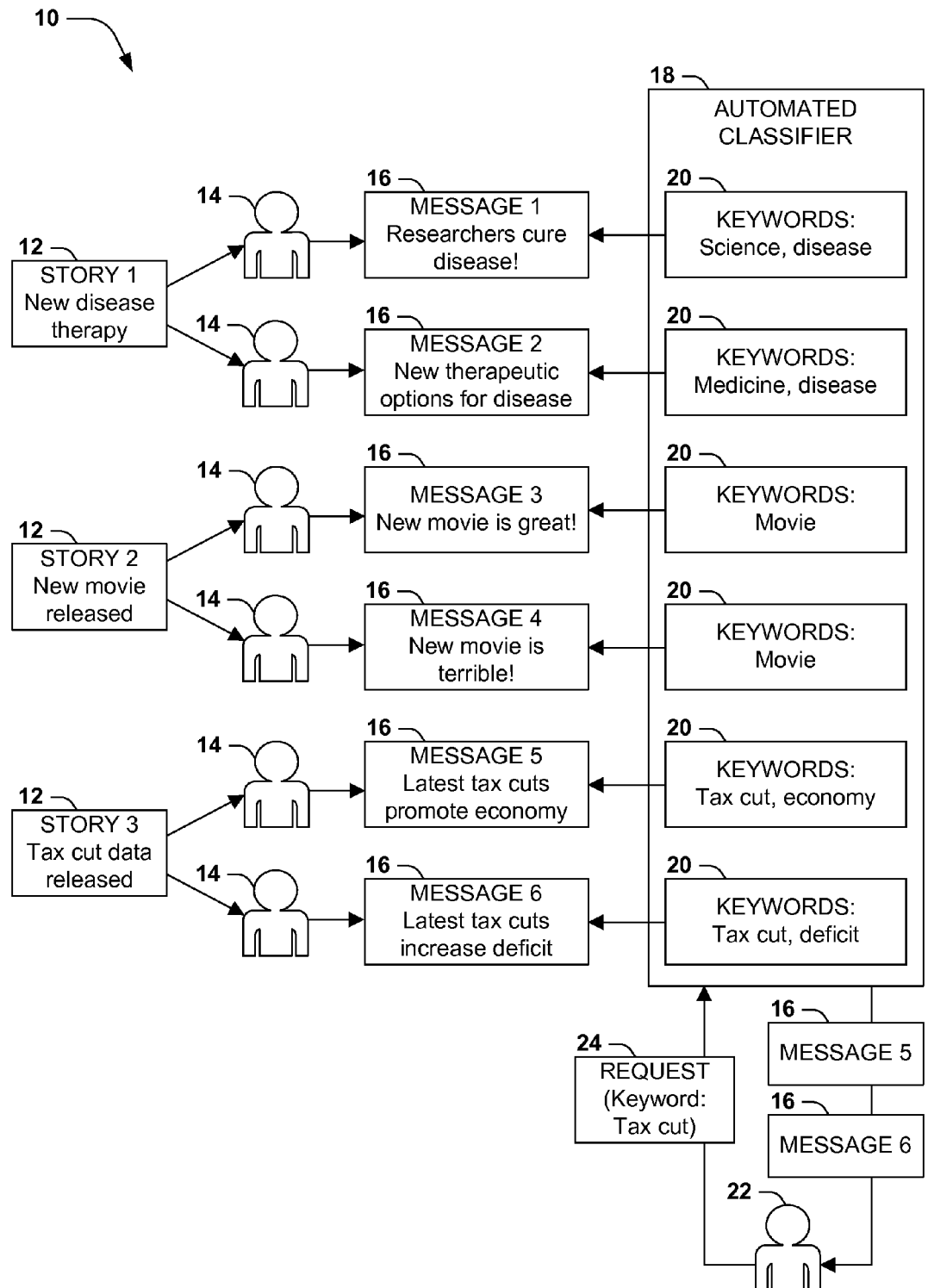
FIG. 1 presents an illustration of an exemplary scenario featuring a keyword-based evaluation and filtering of messages associated with various stories.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Within the field of computing, many scenarios involve a set of messages that may relate one or more stories. As a first example, a set of news articles may relate information about various breaking news stories, or may update previously reported stories with additional information. As a second example, a weblog or set of weblogs may present weblog posts generated by authors about a wide variety of stories that relate to one or more topics comprising a theme of the weblog and/or that relate personal stories of the author. As a third example, within a social network, a group of contacts may exchange public, private, and semi-private messages about various topics, such as stories occurring within a group of friends.

In these and other examples, the messages may be aggregated into a message set. However, a user viewing the message set may not wish to see all of the messages, but may have difficulty identifying the stories or topics related to respective messages in an efficient manner (e.g., without having to read a substantial portion of the message). The user may also wish to filter the message set to a subset of stories or topics of interest, or to view stories having a particular perspective (e.g., written from the viewpoint of a particular political, sociological, religious, and/or philosophical position, or from an author whose messages often espouse such a position). In order to satisfy the viewing interests of the user, various techniques may be applied to categorize the messages, to relate messages to particular stories or topics, and/or to identify various metadata for each message that may be utilized to filter the message set in a desirable manner.

FIG. 1 presents an exemplary scenario 10 featuring one such technique for filtering a set of messages 16 relating to a set of stories, such as a first story 12 involving a newly developed disease therapy; a second story 12 involving a new movie to be released in theaters; and a third story 12 involving a tax cut enacted by a government. In this exemplary scenario 10, each message 16 may have been generated by a message source 14 (e.g., a journalist, an eyewitness of an event, or a commentator), who may generate the message 16 in relation to one or more stories 12. Moreover, each message 16 may have been authored with a particular story perspective on the story 12. As a first example, different story perspectives may relate to different types of target audiences; e.g., with respect to the first story 12 regarding a newly developed therapy for a particular disease, a first message source 14 may generate a first message 16 targeted at the general community with simple language and a practical perspective, while a second message source 14 may generate a second message 16 targeted to the scientific community with complex facts and a technical perspective. As a second example, different story perspectives may relate to different personal opinions; e.g., with respect to the second story 12 regarding a new movie, a first message source 14 may generate a third message 16 featuring a positive review of the movie, while a second message source 14 may generate a fourth message 16 featuring a negative review of the movie. As a third example, different story perspectives may relate to different political philosophies; e.g., with respect to the third story 12 regarding a recently enacted tax cut, a first message source 14 may generate a fifth message 16 written from the perspective of a fiscal progressive and promoting the economy stimulating effects of the tax cut, while a second message source 14 may generate a sixth message 16 written from the perspective of a fiscal conservative and noting the increased government deficit ensuing from the tax cut.

The different content and story perspectives of different messages 16 may add color and variety to the message set in reporting the stories 12, and a user 22 may find some messages 16 more satisfying than others. In particular, the user 22 may wish to view messages 16 having a particular characteristic, such as relating to a particular story 12 or to particular topics, or written with a particular story perspective (e.g., political news stories written from a particular political philosophy). In order to fulfill a request of a user 22 to view particular messages 16, it may be desirable to utilize an automated technique to evaluate and categorize stories, which may efficiently and cost-effectively scale to handle the evaluation of a large volume of messages 16 (e.g., millions of messages 16 exchanged daily within a social network). In the exemplary scenario 10 of FIG. 1, an automated classifier 18 is configured to identify keyword keywords 20 within respective messages 16 that may indicate the topics, stories 12, and/or story perspectives related to each message 16. For example, within the first message 16, keywords may be identified relating to the name of the disease treated, the name of the newly developed therapeutic technique (e.g., a chemical or commercial name of a new drug), and/or the names of the researchers involved. The automated classifier 18 may also classify the first message 16, e.g., as belonging within the field of science. When a user 22 submits a request 24 to view messages 16 involving a particular keyword 20, the automated classifier 18 may retrieve the messages 16 identified as including the keyword 20 and may provide such messages to the user 22.

However, the use of keywords 20 to identify messages 16 relating to particular stories 12, topics (such as individuals), or story perspectives may present some limitations. As a first example, variations in the content of the messages 16 (e.g., differences in cultural languages, target audiences, personal opinions, and formal or colloquial tone of the message 16) may result in variations in the keywords 20 included in different messages 16 relating to the same story 12 and/or topic. As a second example, a first message 16 may refer to a second message 16 (e.g., a news update of a previously reported story, or a weblog post or social network message authored as a response to an earlier weblog post or social network message), and may therefore relate to the same stories 12, topics, and/or story perspectives related in the second message 16, but the first message 16 may not explicitly reiterate the details of the second message 16 and therefore may not include the same keywords 20. As a third example, even keywords 20 for topics identified by proper nouns (e.g., distinctive names of individuals or locations) may vary due to the use of slang or nicknames, or the presence of typographical errors. For at least these reasons, fulfilling the request of the user 22 to view messages 20 associated with a particular story 12 based on a comparison of keywords 20 may be inadequate in identifying the content of the respective messages 16, and in providing requested messages 16 to the user 22. As a second exemplary limitation, the user 22 may simply wish to browse the messages 16, but may have difficulty identifying the content of any particular message 16 without having to read a substantial portion thereof. For example, more formal messages 16 (e.g., news articles posted by a news source) may include a human-generated headline, but the headline may be inadequate (e.g., a headline reading "New Tax Cuts Enacted" may fail to indicate the locality, extent, and date of the tax cuts), and/or may have been authored from a story perspective that obstructs inferences as to the contents of the message 16. Additionally, presenting the keywords 20 with the message 16 may be inadequate to convey to the user 22 the contents of the message 16 (e.g., presenting the detected keywords "tax cut, economy" with a message 16 may not adequately convey to the user 22 the particular tax cuts discussed, or the relationship between the tax cut and the economy that is suggested by the message 16), and may therefore have to read a substantial portion of the message 16 to identify the content presented therein.

In view of these disadvantages, it may be desirable to configure an automated classifier to evaluate the semantics of respective messages 16 in order to identify the stories 12, topics, and story perspective related by each message 16. In particular, it may be desirable to generate an automated classifier 32 that is capable of identifying the facts of respective messages 16 and automatically generating a summary of a story 12 referenced thereby. Moreover, it may be advantageous to generate a summary of a story 12 based on several messages 16 relating the story 12, where such messages 16 are generated by a set of message sources 14 (e.g., different authors or news organizations). By using several messages 16, an automated technique may identify facts that are frequently related in many messages 16 generated by authors 14 having a wide range of perspectives, writing in a wide variety of languages, and writing for a wide range of target audiences, and may therefore use the frequently reported facts to generate the summary of the story 12 in a perspective-, language-, and target-audience-independent manner.

Figure 2:
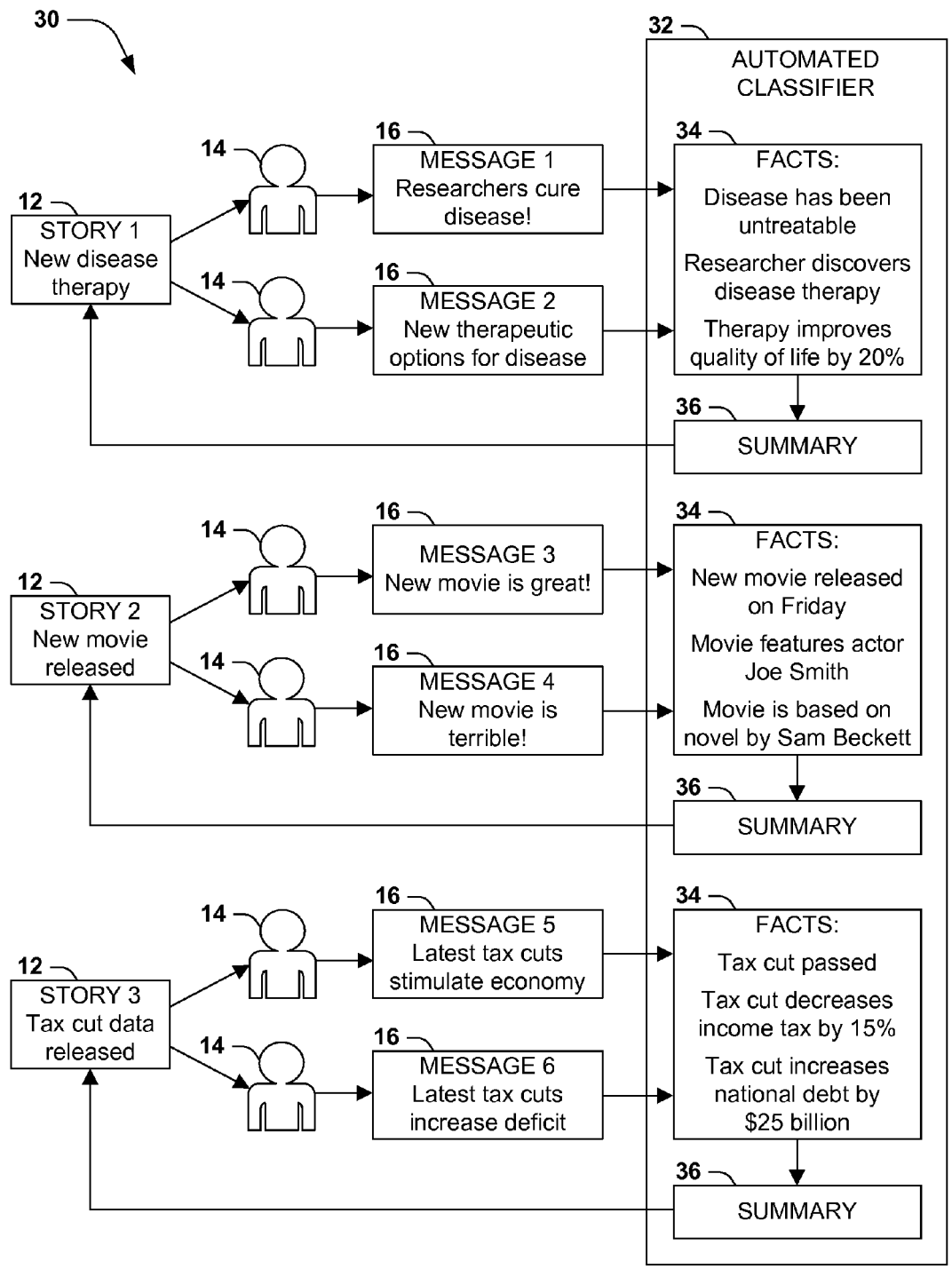
FIG. 2 presents an illustration of an exemplary scenario featuring an automated generation of summaries of stories using facts extracted from messages associated with respective stories in accordance with the techniques presented herein.

FIG. 2 presents an exemplary scenario 30 wherein a set of messages 16 of a message set (e.g., a news source or a social network) are generated by a set of message authors 14 relating to various stories 12. In this exemplary scenario 30, an automated classifier 32 configured according to the techniques presented herein may endeavor to generate a summary 36 of each story 12 by evaluating the messages 16 of the message set in the following manner. The automated classifier 32 first identifies the stories 12 associated with respective messages 16. For each story 12, the messages 16 relating to the story 12 are evaluated together, and facts 34 that are frequently reported in such messages 16 are identified. From these facts 34, a summary 36 may be generated, and may be utilized, e.g., as a title or headline of the story 12. The summaries 36 may then be presented to a user 22 in order to facilitate the rapid evaluation of the messages 16, and/or may be used to satisfy a request 24 from the user 22 to present messages 16 associated with a particular story 12, topic, or story perspective.

Figure 3:
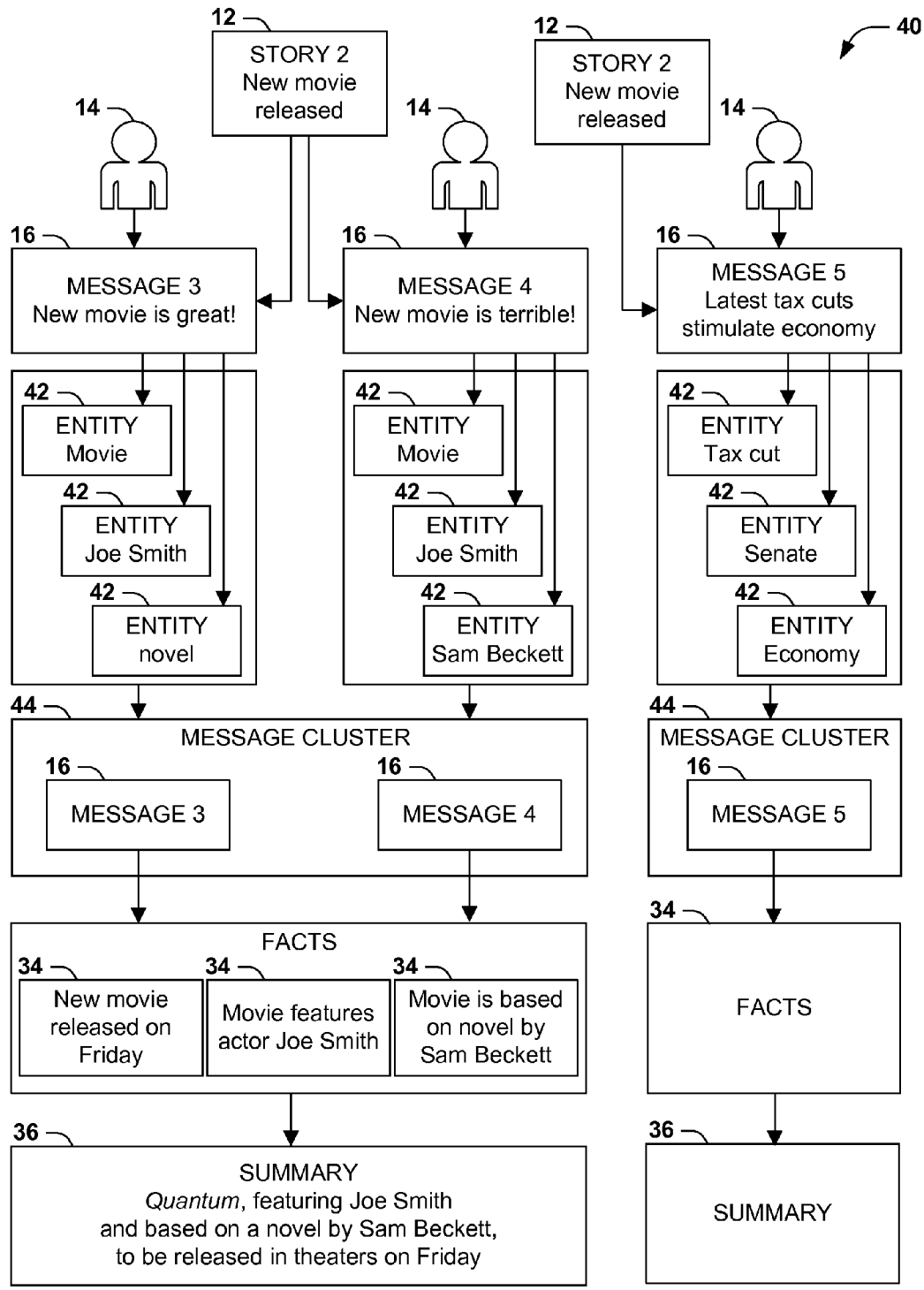
FIG. 3 presents another illustration of an exemplary scenario featuring an automated generation of summaries of stories using facts extracted from messages associated with respective stories in accordance with the techniques presented herein.

FIG. 3 presents an exemplary scenario 40 featuring some additional detail as to the generation of a summary 36 of a story 12. In this exemplary scenario 40, two stories 12 are related in three messages 16, each generated by a particular message author 14. An automated classifier, configured according to the techniques presented herein, may generate a summary 36 of each story 12 in the following manner. First, from each message 16, a set of entities 42 are identified, such as topics, concepts, objects, individuals, events, and locations referenced by the message 16. For example, from a message 16 featuring a positive review of a movie, the entities 42 extracted may include the movie, an actor included in the cast of the movie, and a novel upon which the movie is based. From a second message involving a negative review of the same movie, a similar set of entities 42 may be extracted (possibly including the author of the novel upon which the movie was based, even if the novel is not explicitly referenced); but from a third message relating to the effects of a recently enacted tax cut on the economy, the extracted entities 42 may include the tax cut, the economy, and the political body that enacted the tax cut (e.g., the United States Senate). The entities 42 extracted from each message 16 are compared, and from this comparison, one or more message clusters 44 are identified, comprising messages 16 involving a similar set of entities 42 and likely relating to the same story 12. For example, a first message cluster 44 may be identified comprising the messages 16 associated with the story 12 about the release of the movie, and a second message cluster 44 may be identified comprising the message 16 associated with the story 12 of the tax cut. The messages 16 within each message cluster 44 may be evaluated together to identify a set of facts 34 that appear frequently in the messages 16. For example, this evaluation may be reveal that messages 16 relating to the story 12 of the release of the new movie often mention that the movie is to be released in theaters on an upcoming Friday; that the movie features a particular actor named Joe Smith 34; and that the movie is based on a popular novel by the author Sam Beckett. Based on these frequently reported facts 34, the automated classifier may automatically generate a summary 36.

These summaries 36 generated in the exemplary scenario 40 of FIG. 3 (and in accordance with the techniques presented herein) may be used in various ways. For example, the summaries 36 presented to users 22 as a summary, title, or headline of the respective stories 12, and may be displayed with various messages 16 to present additional context (e.g., to relate the facts of a story 12 that are referenced or implied by the message 16). Moreover, the summary 36 generated from the facts 34 extracted from many messages 16 may be independent of the story perspectives of the messages 16, including the political, sociological, religious, and/or philosophical perspectives of the message sources 14 of the messages 16. These summaries 36 may also be less dependent upon the keywords 20 that may or may not be included in each message 16; e.g., the first message 16 may omit the name of the author of the novel, and the second message 16 may omit the name of the novel, but both messages 16 may be associated with the same story 12 that involves all of these facts 34, and may therefore be included in searches submitted by users 22 involving such facts 34 (e.g., the first message 16 may be presented in response to a search for messages 16 and stories 12 about the novel, even though the name of the novel is not mentioned in the first message 16, because the first message 16 is identified as associated with the story 12 including a fact 34 referencing the novel). Additionally, the automated generation of summaries 36 may efficiently and cost-effectively scale to handle the categorization of a large volume of messages 16, such as millions of messages 16 posted within a social network on a particular day. These and other advantages may be achieved through the automated generation of summaries 36 of stories 12 according to the techniques presented herein.

Figure 4:
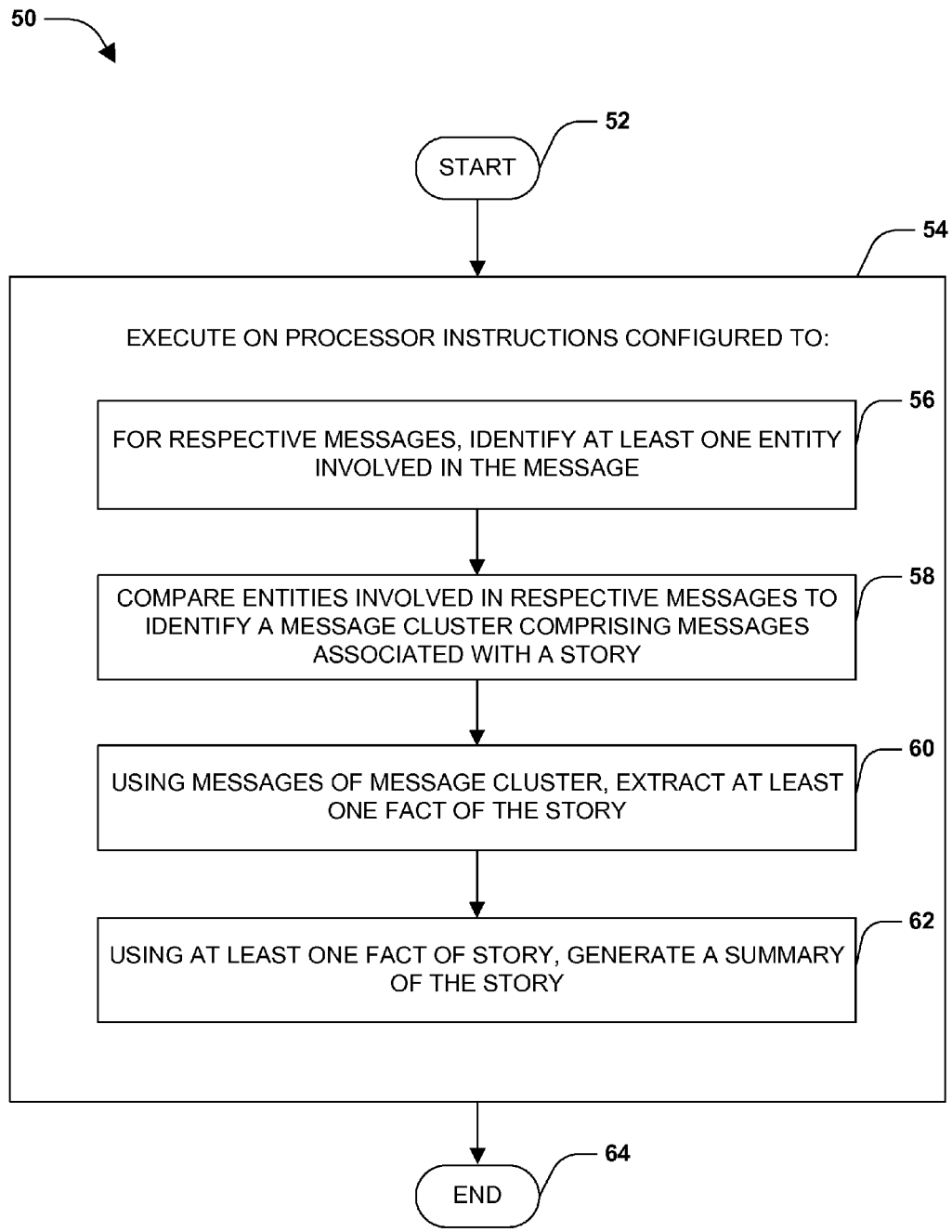
FIG. 4 is a flow chart illustrating an exemplary method of generating summaries of stories respectively associated with at least one message.

FIG. 4 presents a first embodiment of these techniques, illustrated as an exemplary method 50 of generating summaries 36 of stories 12 respectively associated with at least one message 16. The exemplary method 50 may be implemented, e.g., as a set of software instructions stored in a memory component (e.g., a system memory circuit, a platter of a hard disk drive, a solid state storage device, or a magnetic or optical disc) of the computer 12, that, when executed by the processor of the computer 12, cause the processor to perform the techniques presented herein. The exemplary method 50 begins at 52 and involves executing 54 the instructions on the processor. More specifically, the instructions are configured to, for respective messages 16, identify 56 at least one entity 42 involved in the message 16. The instructions are also configured to compare 58 the entities 42 involved in respective messages 16 to identify a message cluster 44, comprising the messages 16 associated with a particular story 12. The instructions are also configured to, using the messages 16 of the message cluster 44, identify 60 at least one fact 34 of the story 12. The instructions are also configured to, using the at least one fact 34 of the story 12, generate 62 a summary 36 of the story 12. In this manner, the exemplary method 50 achieves an automated generation of a summary 36 of the story 12, and so ends at 64.

Figure 5:
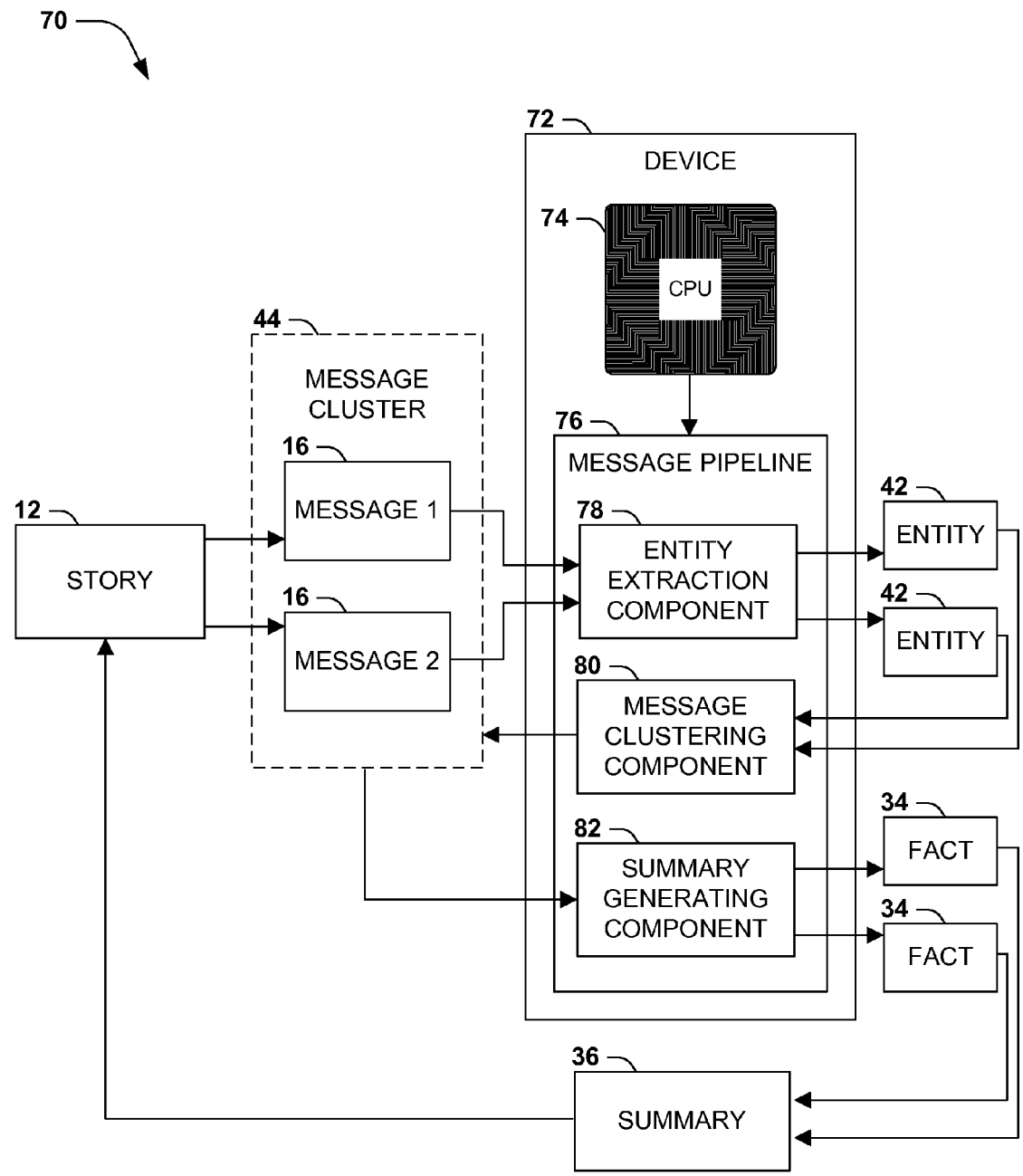
FIG. 5 is a component block diagram illustrating an exemplary message processing pipeline for generating summaries of stories respectively associated with at least one message.

FIG. 5 presents a second embodiment of the techniques presented herein, illustrated as a message processing pipeline 76 configured to generate summaries 36 of stories 12 respectively associated with at least one message 16. The message processing pipeline 76 may be implemented, e.g., as a software architecture, comprising a series of interoperating components that in turn evaluate a message 16 to perform one or more tasks involved in automatically generating the summary 36 of the story 12. Each component of the message processing pipeline 76, in turn, may be implemented as a set of software instructions stored in a memory component (e.g., a system memory circuit, a platter of a hard disk drive, a solid state storage device, or a magnetic or optical disc) of a device 72, where the instructions, when executed (concurrently or consecutively) by the processor of the device 72, cause the processor 74 to perform one or more tasks of the techniques presented herein. The message processing pipeline 76 includes an entity extraction component 78, which is configured to, for respective messages 16, identify at least one entity 42 involved in the message 16. The message processing pipeline 76 also includes a message clustering component 80, which is configured to compare the entities 42 involved in respective messages 16 to identify a message cluster 44 comprising the messages 16 associated with a particular story 12. The message processing pipeline 76 also includes a summary generating component 82, which is configured to, using the messages 16 of the message cluster 44, identify at least one fact 34 of the story 12; and, using the facts 34 of the story 12, generate a summary 36 of the story 12. In this manner, the message processing pipeline 76 automatically generates summaries of the stories 36 from the facts 34 frequently reported in the set of messages 16 associated with the story 12.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 6:
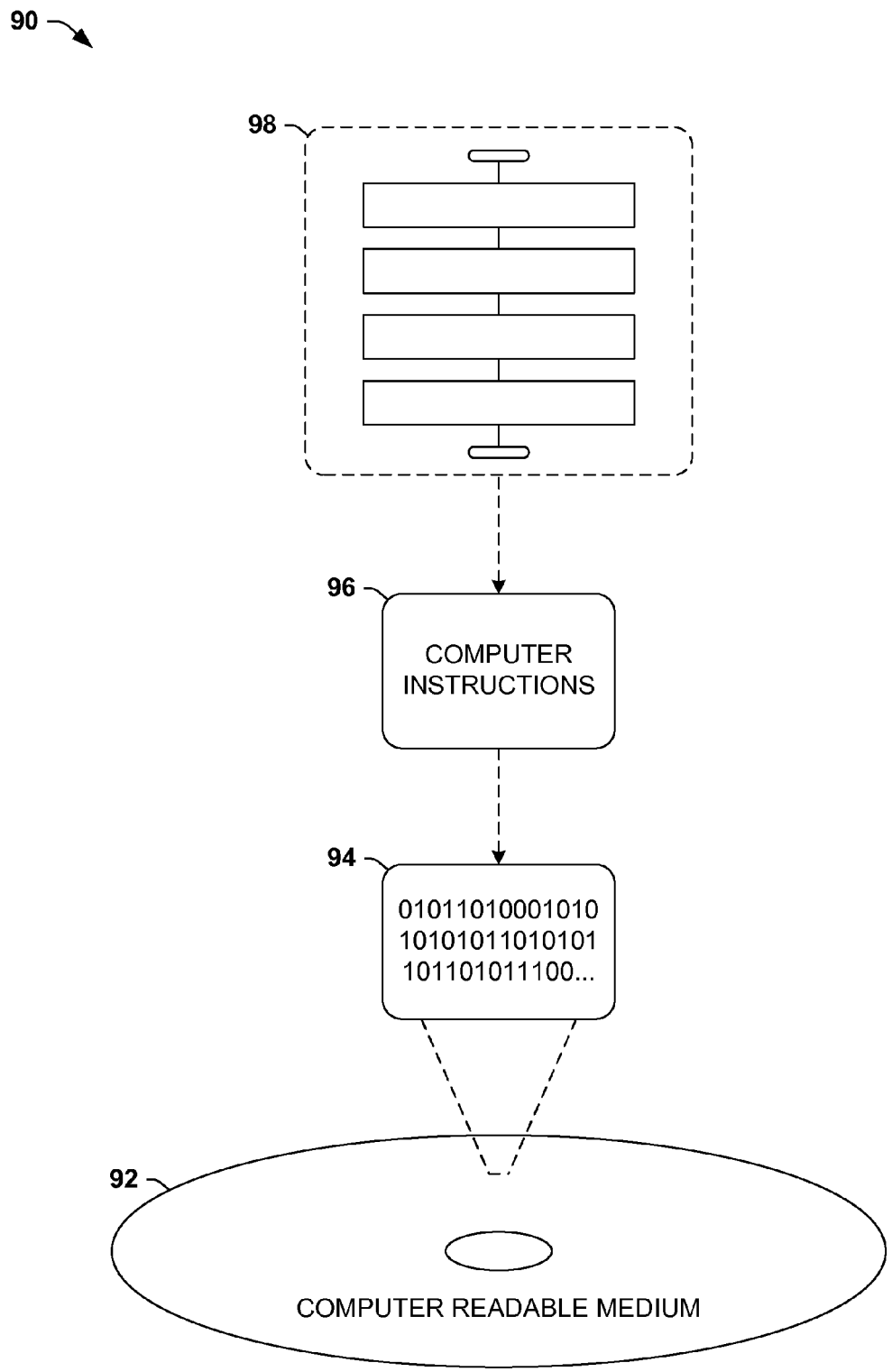
FIG. 6 is an illustration of an exemplary computer-readable medium comprising processor-executable instructions configured to embody one or more of the provisions set forth herein.

An exemplary computer-readable medium that may be devised in these ways is illustrated in FIG. 6, wherein the implementation 900 comprises a computer-readable medium 902 (e.g., a CD-R, DVD-R, or a platter of a hard disk drive), on which is encoded computer-readable data 904. This computer-readable data 904 in turn comprises a set of computer instructions 906 configured to operate according to the principles set forth herein. In one such embodiment, the processor-executable instructions 906 may be configured to perform a method of generating summaries of stories respectively associated with at least one message, such as the exemplary method 50 of FIG. 4. In another such embodiment, the processor-executable instructions 906 may be configured to implement a message processing pipeline for generating summaries of stories respectively associated with at least one message, such as the exemplary message processing pipeline 76 of FIG. 5. Some embodiments of this computer-readable medium may comprise a nontransitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 50 of FIG. 4 and the exemplary message processing pipeline 76 of FIG. 5) to confer individual and/or synergistic advantages upon such embodiments.

A first aspect that may vary among embodiments of these techniques relates to the scenarios wherein these techniques may be utilized. As a first example, these techniques may be utilized to evaluate many types of messages 16, including news articles provided by various news sources; weblog posts generated by various weblog authors; web forum messages posted in various web forums; public, semi-private, and/or private messages posted in various social networks; and email messages sent and/or received by one or more users 22. As a second example, these techniques may identify many types of stories 12 to which such messages 16 relate, including breaking news stories; descriptions of past, present, and/or future events; fictional stories; personal anecdotes; commentaries on various political, sociological, religious, and/or philosophical topics; and reviews of various products, services, and media. As a third example, these techniques may, while evaluating the messages 16, extract many types of entities 34 therefrom, including individuals, locations, objects, devices, machines, events, bodies of knowledge, concepts, and collections of data. Those of ordinary skill in the art may devise many scenarios wherein the techniques presented herein may be advantageously utilized.

A second aspect that may vary among embodiments of these techniques relates to the architecture of the embodiments. Some embodiments may be configured simply as a process (e.g., the exemplary method 50 of FIG. 4), wherein a fixed set of tasks may be applied to the messages 16 to generate summaries 36 of the stories 12 related therein. However, it may be appreciated that the wide variety of scenarios wherein the techniques may be utilized may encourage a more robust architecture of an embodiment of these techniques that may be adjusted to account for the wide variety of messages 16. Therefore, in some scenarios, it may be advantageous to devise the architecture of an embodiment as a message processing pipeline, such as the message processing pipeline 76 in the exemplary scenario 70 of FIG. 5, comprising a modular set of interoperating components, each of which performs one or more tasks upon respective messages 16 being processed by the embodiment. For example, in order to apply the message processing pipeline 76 to the messages 16 of a particular message source 14, the message processing pipeline 76 may be adjusted, e.g., by swapping out some components with other components that are specially customized to evaluate messages 16 from this message source 14, or from the messages sources 14 of a particular type (e.g., a first component or set of components configured to evaluate messages 16 of a technical nature published in an academic journal, and a second component or set of components configured to evaluate messages 16 of a casual nature published in a social network). Additionally, the architecture of a message processing pipeline 76 may more readily permit the insertion of new modules to provide additional features, such as an evaluation of new types of metadata about the messages 16. For example, the message processing pipeline 76 may include a message processing pipeline customizing component, which may be configured to, upon receiving a custom component to be inserted into the message processing pipeline 76, insert the custom component into the message processing pipeline 76. The architectural flexibility provided by a message processing pipeline 76 may advantageously promote the application of such an embodiment to a wider range of message sources 14, and/or the customization of the evaluation to perform additional types of processing. Those of ordinary skill in the art may devise many types of architectures for embodiments of the techniques presented herein.

A third aspect that may vary among embodiments of these techniques relates to the manner of extracting entities 42 from various messages 16 (e.g., the configuration of an entity extraction component 78). Various text processing, lexical, linguistic, and/or statistical techniques may be utilized to achieve this extraction of entities 42. For example, keyword analysis may be utilized to identify keywords 20 appearing in the message 16. Such keywords 20 may be identified using linguistic techniques; e.g., the capitalization of words may indicate a proper noun naming an entity 42. Additionally, for respective messages 16 of the message cluster 42, an entity extraction component 78 may identify respective sentences, and may identify a set of tokens within each message 16 (e.g., from the phrase "Joe Smith rode a recumbent bicycle across the Golden Gate Bridge," the tokens "Joe Smith," "recumbent bicycle," and "Golden Gate Bridge" may be identified, optionally including the interstitial tokens "rode," "a," "across," and "the"). For respective tokens a speech part may be identified (e.g., a noun, verb, adjective, adverb, article, preposition, conjunction, or interjection), and various entities 42 may be extracted from the identified tokens. Alternatively or additionally, facts 34 may be extracted from the tokens, optionally including tokens that are not necessarily associated with entities 42 (e.g., the token "jogging" may not be associated with a particular entity, but if many messages 16 about a story 12 mention that a particular individual, such as a celebrity, was spotted jogging in a particular location, the token "jogging" may be included in a fact 34 about the story 12). Alternatively or additionally, metadata may be utilized to extract entities 42 involved in a message 16, such as one or more hashtags associated with a message 16 by a message source 14, or various metadata items about the message 16 (e.g., for a recurrent event, a date on which the message 16 was authored or published may indicate a particular instance of the event to which a story 12 relates). Those of ordinary skill in the art may identify many ways of extracting entities 42 and facts 34 from messages 16 in accordance with the techniques presented herein.

A fourth aspect that may vary among embodiments of these techniques relates to the evaluation of messages 16 authored in different languages. Such languages may be cultural (e.g., English, French, and Spanish), tonal (e.g., a formal language of a news organization and a colloquial language used within a social network), or based on different target audiences and/or literacy levels (e.g., a report of a scientific story for the general population, as compared with a report of the same scientific story in an academic journal). An embodiment of these techniques may encounter messages 16 authored in many such languages, and may be configured to handle the evaluation of such messages 16 in various ways. For example, a message processing pipeline 76 may include a language identifying component, which may be configured to, for respective messages 16, identify a language of the message 16 (e.g., based on linguistic analysis or a comparison of the vocabulary of the message 16 with frequently used words in respective languages). The message processing pipeline 76 may then utilize the identified language of the message 16 in various ways. As a first example, the message processing pipeline 76 may define a target language (e.g., a particular language supported by the message processing pipeline 76), and may simply discard all messages 16 authored in languages other than the target language. As a second example, the language identifying component may, upon identifying a source language of a message that is different from a target language, automatically translate the message 16 from the source language to the target language before further processing the translated message 16. As a third example, the message processing pipeline 76 may include one or more multilingual components, featuring two or more language subcomponents that are configured to apply a particular task to messages 16 respectively authored in each of two or more languages (e.g., a first language subcomponent configured to process messages 16 in a first language, and a second language subcomponent configured to process messages 16 in a second language). The message processing pipeline 76 may therefore process a message 76 authored in a particular language by invoking a corresponding a language subcomponent for the language. Using any of these techniques or a combination thereof, the message processing pipeline 76 may therefore evaluate a set of messages 16 authored in a wide range of languages, and may associate messages 16 written in different languages with the same story 12.

Figure 7:
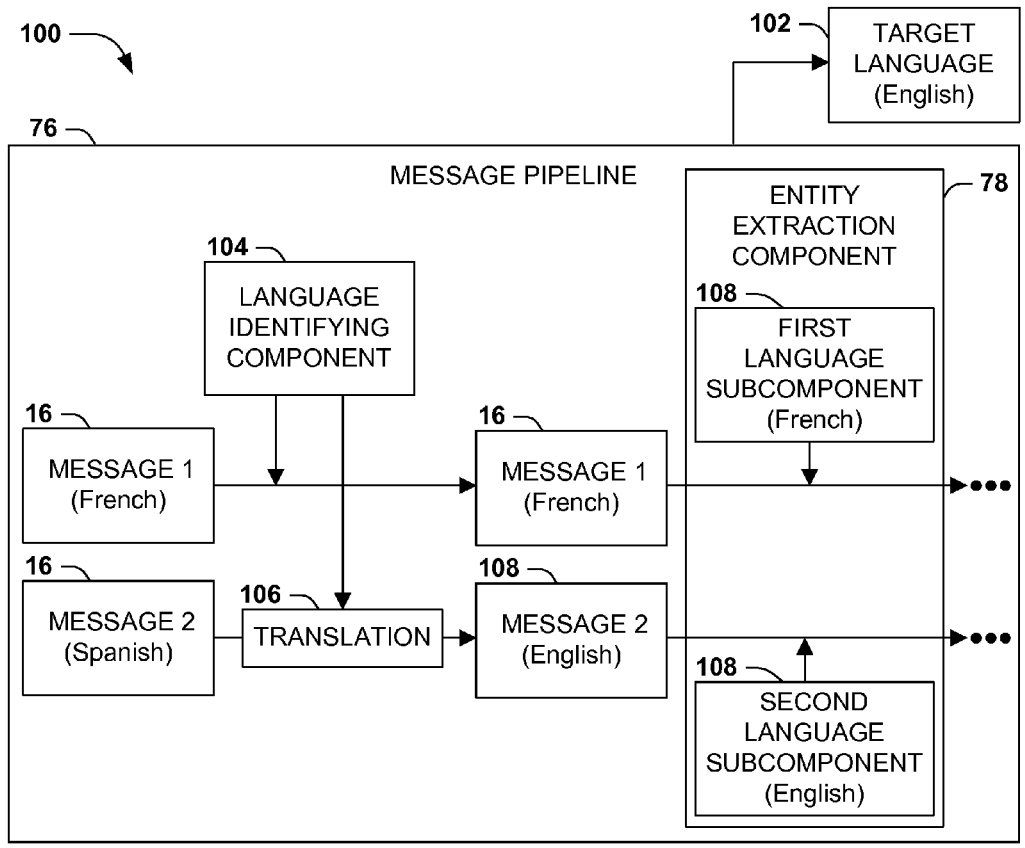
FIG. 7 is an illustration of an exemplary scenario featuring a message processing pipeline configured to process messages of different languages.

FIG. 7 presents an illustration of an exemplary scenario 100 featuring a message processing pipeline 76 configured to evaluate messages 16 in various languages. In this exemplary scenario 100, the message processing pipeline 76 may identify a target language 102 in which the message processing pipeline 76 is natively configured to process messages 16. Upon receiving a message 16, the message processing pipeline 76 may first apply a language identifying component 104, which may examine the content of the message 16 to identify a language of the content of the message 16. For example, the message processing pipeline 76 may identify a target language 102 of English, but may receive a first message 16 written in French and a second message 16 written in Spanish. However, instead of discarding the messages 16 not written in the target language 102, the message processing pipeline 76 of this exemplary scenario 100 endeavors to include the messages 16 in the evaluation of stories 12 related thereto. For example, the language identifying component 104 may also perform an automated translation 106 of the second message 16 in order to generate a translated message 108 in the target language 102, which may be natively evaluated by the remaining components of the message processing pipeline 76. Additionally, one or more components of the message processing pipeline 76 may comprise a multilingual component, featuring two or more language subcomponents that are configured to apply a particular task to messages 16 respectively written in two or more languages. For example, the entity extraction component 78 of the message processing pipeline 76 may include a first language subcomponent 108 configured to extract entities 42 from messages 16 written in French and a second language subcomponent 108 configured to extract entities 42 from messages 16 written in English. To the first message 16 (in French) and the translated message 108 (in English), the entity extraction component 78 may respectively apply the first language subcomponent 108 and the second language subcomponent 108, and may thereby extract entities from the messages 108 in a similar manner irrespective of the languages presented by each message 16. Those of ordinary skill in the art may devise many ways of evaluating messages 16 written in different languages in accordance with the techniques presented herein.

A fifth aspect that may vary among embodiments of these techniques relates to additional features that may be included in an evaluation of messages 16, e.g., additional processing and/or transformation of a message 16 that may promote the extraction of entities 42 and facts 34, and/or the identification of additional metadata about respective messages 16 that may be utilized while fulfilling a request 24 of a user 22 to view particular types of messages 16. As previously discussed, the modular nature of a message processing pipeline architecture may promote the flexibility of an embodiment to incorporate such additional features, e.g., by permitting a new component to be inserted into the evaluation process to implement the new feature.

As a first variation of this fifth aspect, an embodiment of these techniques may be applied to evaluate messages 16 of a message source 14 that often includes various forms of slang (e.g., unusual words, nicknames, or acronyms that are familiar to a particular community, but that may be unusual or difficult to understand outside of the community). Accordingly, an embodiment of these techniques may include a slang translating component, which may be configured to identify at least one slang phrase of respective messages 16 according to a language of the message 16 (e.g., the particular language of a community), and to translate the slang phrase into at least one token of the message 16 (e.g., expanding a nickname for a particular individual into a proper name that may be associated with an entity 42).

As a second variation of this fifth aspect, various messages 16 may include references to various entities 42, but some such references may be ambiguous. For example, the token "Bill" included in a first message 16 may refer to a particular friend within a social group, but in a second message 16 comprising a movie review may refer to an actor starring in the movie, and in a third message 16 involving a political story may relate to a particularly significant piece of legislation. Therefore, an embodiment of these techniques may include an entity resolution component, which may be configured to, for respective entities 42 identified by the entity extraction component 78, identify at least one ambiguous reference of a message 16 identifying one of at least two possible entities 42, and among the possible entities 42, identify the entity 42 identified by the ambiguous reference of the message 16. For example, when a particularly ambiguous token is detected in a message 16, the entity resolution component may be invoked, which may evaluate the context of the message 16 and identify the entity 42 referenced by the ambiguous token.

As a third variation of this fifth aspect, various messages 16 evaluated by the techniques presented herein may explicitly or implicitly reference an associated message. For example, a news story may be later referenced by a message 16 updating the news story with additional information, or commenting upon the substance of the news story; and a weblog post or message 16 within a social network may explicitly or implicitly address another post or message 16 in a responsive manner. Accordingly, a message processing pipeline embodiment of the techniques presented herein may include a reference importing component, which may be configured to, for respective messages 16, identify at least one reference to an associated message 16, and import the at least one associated message 16 into the message 16 for the extraction of entities 42. For example, if a message 16 posted on a web page includes a hyperlink to an associated message 16, the content of the associated message 16 may be retrieved and included in the evaluation of the message 16 to extract entities 42 therefrom. In this manner, the entities 42 explicitly referenced by a first message 16 may be imputed to associated messages 16 explicitly or implicitly referencing the first message 16.

As a fourth variation of this fifth aspect, a message 16 about a story 12 may be authored by a message source 14 in view of a particular story perspective. As a first example, a message source 14 may hold a particular political, sociological, religious, and/or philosophical perspective, and may author a commentary about a particular event, issue, or individual from that perspective. As a second example, a message 16 may be targeted to a target audience having particular demographics, such as a particular age, race, gender, ethnicity, geographic location, income bracket, educational background, literacy level, or shared interests, and the targeting may affect the story perspective of the message 16 while relating the story 12 (e.g., for a story 12 about a research study, a first message 16 targeted to the general population as a news story may have a different perspective than a second message 16 targeted to an academic community as a technical article). Accordingly, an embodiment of these techniques may include a story perspective identifying component, which may be configured to, for respective messages 16, identify a story perspective of the message 16 with respect to the story 12. For example, the story perspective identifying component may identify a particular vocabulary associated with each perspective (e.g., a first set of political "buzzwords" or slang often appearing in fiscally progressive messages, and a second set of political "buzzwords" or slang often appearing in fiscally conservative messages), and may identify the story perspective of a particular message 16 based on the vocabulary utilized therein. The identified story perspective may be useful, e.g., to fulfill a request 24 of a user 22 to present messages 16 relating a story 12 from a particular story perspective; e.g., a user 22 holding a particular political perspective may present a request 24 to filter the messages 16 of a message set (such as news stories of a news feed) to those authored from a story perspective. Moreover, a message processing pipeline 76 may also comprise a message source perspective identifying component, which may be configured to, for respective message sources 14 generating at least one message 16, identify a message source perspective of the message source 14 according to the story perspectives of the stories 12 of the messages 16 generated by the message source 14. For example, if a particular message source 14 often generates messages 16 from a particular story perspective, the message source perspective identifying component may identify the message source 14 as having a message source perspective matching the frequently identified story perspectives (e.g., a fiscally conservative message source), and this identification may later be utilized to fulfill a request 24 of a user 22 (e.g., a request 24 to filter a news feed to stories generated by news sources having a fiscally conservative perspective).

As a fifth variation of this fifth aspect, in addition to generating a summary 36 of a story 12 based on a set of messages 16, it may also be advantageous to identify a "meta-summary" of the story 12. For example, a first story 12 may relate the historical visit of U.S. President Richard Nixon to the nation of China, and a second historical story 12 may relate a historical visit by the Queen Elizabeth II to the United States. Both stories involve three entities 42: a U.S. President and a Queen of England (both heads of state), a visit, and the nations of China and the United States (both nations of the world); thus, both stories may be summarized with the same "meta-summary" of a head of state visiting a nation of the world. It may be advantageous to associate both stories 12 with this meta-summary, e.g., in order to answer more abstract requests 24 of a user 22 (e.g., a request to present stories about heads of state visiting other nations during a particular week.) Accordingly, a message processing pipeline 76 may include a meta-summary generating component, which may be configured to, for respective stories 12, classify respective entities 42 involved in the summary 36 (e.g., the entities 42 extracted from the messages 16 relating the story 12) according to an entity type, and generate a meta-summary classifying the story 12 according to the entity types of the entities 42 involved in the summary 36.

Figure 8:
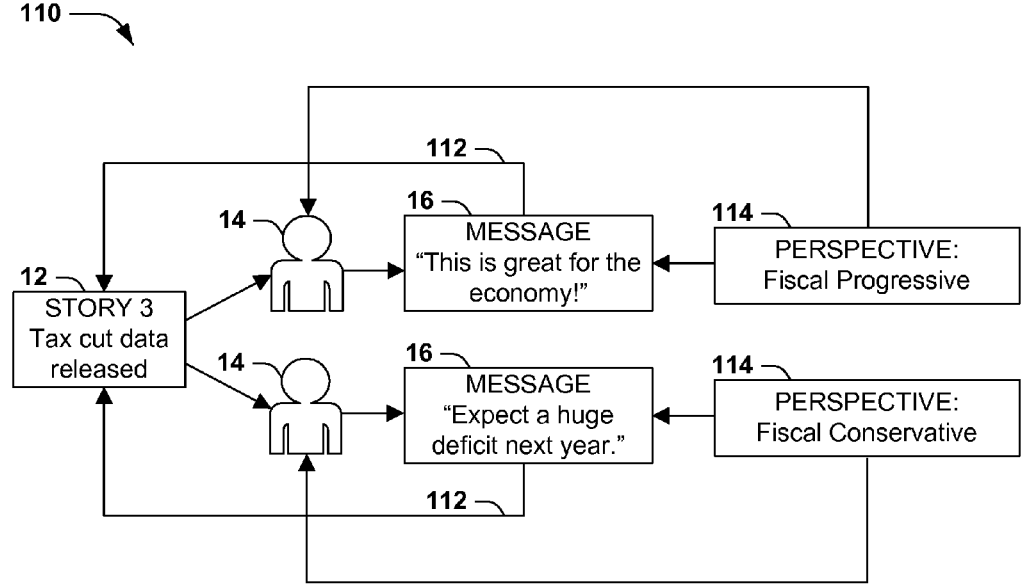
FIG. 8 is an illustration of an exemplary scenario featuring an identification of a story perspective of respective stories relating a particular story and the message source perspectives of the message sources of the messages.

FIG. 8 presents an illustration of an exemplary scenario 110 featuring the application of several variations of this fifth aspect. In this exemplary scenario 110, a story 12 about recently released data concerning a tax cut may be related in a first message 16 posted by a first message source 14, and also in a second message 16 posted by a second message source 14 (e.g., bloggers writing for different weblogs, or different users 22 of a social network). However, the first message source 14 may author the first message 16 from a first story perspective 114 (e.g., a fiscally progressive perspective), and the second message source 14 may author the second message 16 from a second story perspective 114 (e.g., a fiscally conservative progressive). A story perspective identifying component of a message processing pipeline 76 may evaluate the content of each message 16, and may identify the story perspective 114 on the story 12 expressed by each message 16. Moreover, the story perspectives 114 may be attributed to the message sources 14 of the respective messages 16, thereby identifying each message source 14 with a particular message source perspective (particularly if the message source 14 frequently generates messages 16 from a particular story perspective 114). As yet another feature, the messages 16 may not explicitly identify the story 12, but may indirectly reference the story 12 (e.g., by including a hyperlink) or by context (e.g., a reply to an earlier message 16 about the story 12, or simply a comment that an educated human reader may interpret as a reference to the story 12), and a reference importing component may retrieve other messages 16 about the story 12 and include such messages 16 in the evaluation of the referring messages 16. In this manner, the exemplary scenario 110 illustrates the application of several of the variations of this fifth aspect. Those of ordinary skill in the art may devise many such features that may be included in an embodiment of these techniques, and corresponding components that may be inserted into a message processing pipeline 76, in accordance with the techniques presented herein.

A sixth aspect that may vary among embodiments of these techniques relates to the uses of the summaries 36 of stories 12 that are automatically generated by the techniques presented herein. As a first variation, the summaries 36 may simply be presented with respective stories 12 (e.g., as an automatically generated title or headline of the story 12, or as a synopsis of the story 12). As a second variation, the summaries 36 may be presented with messages 16 associated with the story 12, e.g., to supplement the message 16 with facts 34 of the story 12 that may have been omitted from the message 16.

As an example of this sixth aspect, an embodiment of these techniques may store the summaries 36 of respective stories 12, and may use the stored summaries 36 to fulfill requests 24 of users 22. For example, a message processing pipeline 76 may include a story store, which may be configured to store, for respective stories 12, a summary 36 and at least one message 16 associated with the story 12. The message processing pipeline 76 may also include a story presenting component, which may be configured to, upon receiving a request 24 to present stories 12, retrieve from the story store at least one summary 36 of at least one story 12, and present the at least one summary 36 of the at least one story 12 in response to the request 24. Additionally, upon receiving a selection of a selected story 12, the story presenting component may present at least one message 16 associated with the selected story 12 in response to the request 24. As an additional variation, the story presenting component may, for respective stories 12 to be presented in response to a request 24, retrieve at least one media object involving at least one entity 42 involved in the story 12 (e.g., an image of an individual or location referenced in the story 12), and may present the at least one media object with the summary of the story 36.

Additional variations of this sixth aspect may permit a selective filtering of the stories 12 so presented, based on various metadata aspects identified while processing the messages 16 associated with the stories 12. As a first such variation, upon receiving a request 24 to present stories 12 involving a selected entity (e.g., a particular individual or location), the story presenting component may retrieve from the story store the summaries 36 of stories 12 involving the selected entity, and present the retrieved summaries 36 in response to the request 24. As a second such variation, the story store may store, with respective messages 16, a story perspective of the message 16 with respect to the story 12 (e.g., a political bias of respective messages 16 about a political event 12), and upon receiving a request 24 to present messages 16 having a particular story perspective with respect to a story 12, the story presenting component may retrieve from the story store at least one selected message 16 having the story perspective with respect to the story 12, and may present the at least one selected message 16 in response to the request 24. In these and other ways, the messages 16 and stories 12 may be filtered in various ways to fulfill various requests 24 of a user 22 for a particular subset of stories 12 and messages 16. Those of ordinary skill in the art may devise many uses of summaries 36 of stories 12 and associated metadata that may be automatically generated according to the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
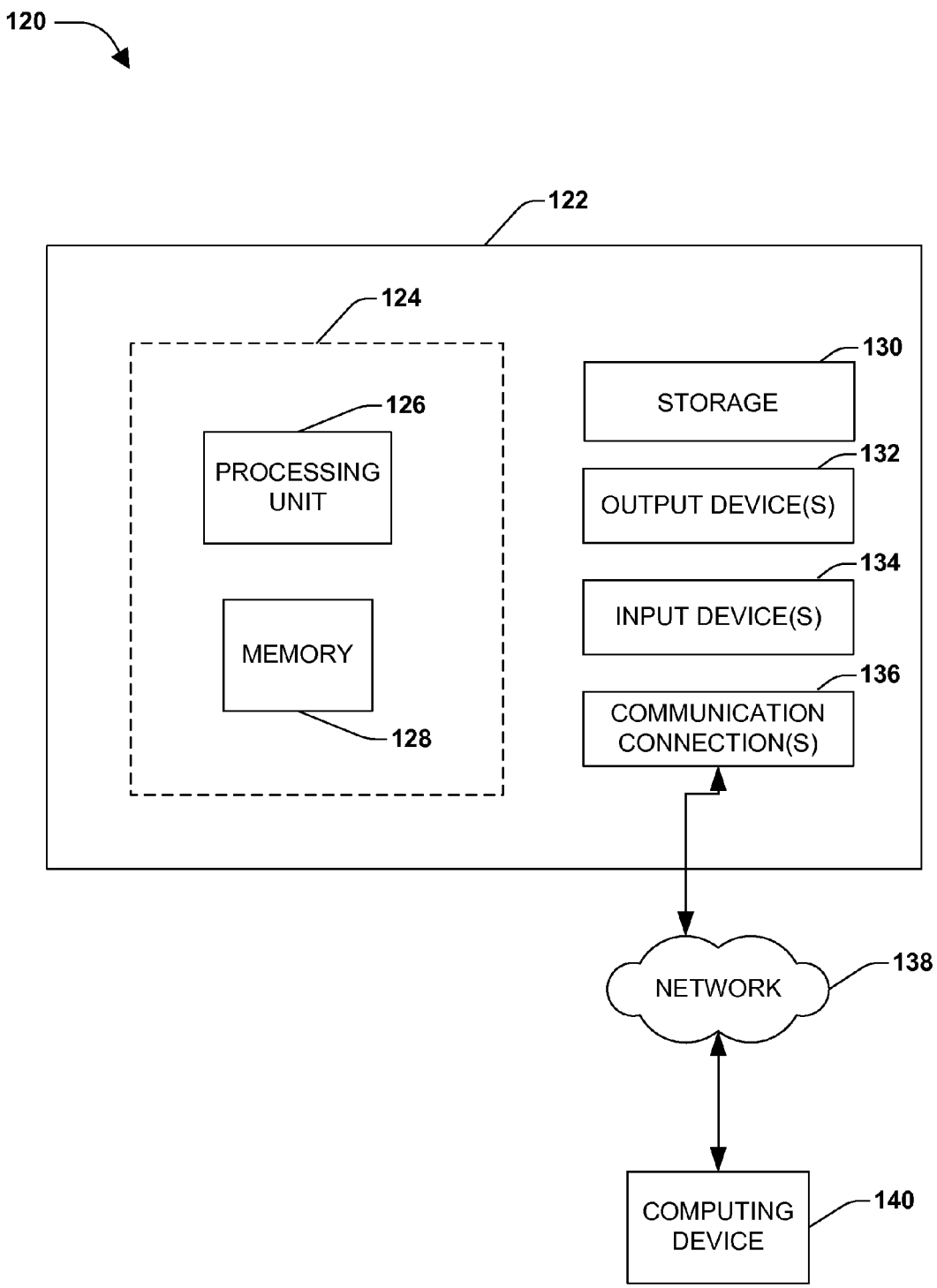
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 120 comprising a computing device 122 configured to implement one or more embodiments provided herein. In one configuration, computing device 122 includes at least one processing unit 126 and memory 128. Depending on the exact configuration and type of computing device, memory 128 may be volatile (such as RAM, for example), non-volatile (such as ROM, flash memory, etc., for example) or some combination of the two. This configuration is illustrated in FIG. 9 by dashed line 124.

In other embodiments, device 122 may include additional features and/or functionality. For example, device 122 may also include additional storage (e.g., removable and/or non-removable) including, but not limited to, magnetic storage, optical storage, and the like. Such additional storage is illustrated in FIG. 9 by storage 130. In one embodiment, computer readable instructions to implement one or more embodiments provided herein may be in storage 130. Storage 130 may also store other computer readable instructions to implement an operating system, an application program, and the like. Computer readable instructions may be loaded in memory 128 for execution by processing unit 126, for example.

The term "computer readable media" as used herein includes computer storage media. Computer storage media includes volatile and nonvolatile, removable and non-removable media implemented in any method or technology for storage of information such as computer readable instructions or other data. Memory 128 and storage 130 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 122. Any such computer storage media may be part of device 122.

Device 122 may also include communication connection(s) 136 that allows device 122 to communicate with other devices. Communication connection(s) 136 may include, but is not limited to, a modem, a Network Interface Card (NIC), an integrated network interface, a radio frequency transmitter/receiver, an infrared port, a USB connection, or other interfaces for connecting computing device 122 to other computing devices. Communication connection(s) 136 may include a wired connection or a wireless connection. Communication connection(s) 136 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 122 may include input device(s) 134 such as keyboard, mouse, pen, voice input device, touch input device, infrared cameras, video input devices, and/or any other input device. Output device(s) 132 such as one or more displays, speakers, printers, and/or any other output device may also be included in device 122. Input device(s) 134 and output device(s) 132 may be connected to device 122 via a wired connection, wireless connection, or any combination thereof. In one embodiment, an input device or an output device from another computing device may be used as input device(s) 134 or output device(s) 132 for computing device 122.

Components of computing device 122 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 122 may be interconnected by a network. For example, memory 128 may be comprised of multiple physical memory units located in different physical locations interconnected by a network.

Those skilled in the art will realize that storage devices utilized to store computer readable instructions may be distributed across a network. For example, a computing device 140 accessible via network 138 may store computer readable instructions to implement one or more embodiments provided herein. Computing device 122 may access computing device 140 and download a part or all of the computer readable instructions for execution. Alternatively, computing device 122 may download pieces of the computer readable instructions, as needed, or some instructions may be executed at computing device 122 and some at computing device 140.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of presenting summaries of stories respectively associated with at least one message on a computer having a processor, the method comprising:
    executing on the processor instructions configured to:
        for respective messages, identify at least one entity involved in the message;
        cluster the messages according to the at least one entity identified in the respective messages to identify, for a story, a message cluster comprising at least two messages that individually present the story;
        using the messages of the message cluster, identify at least one expression that frequently appears in the messages of the message cluster;
        identify at least two opinions about the story that are respectively expressed by at least one message of the message cluster;
        from the at least one expression of the messages, extract at least one fact of the story; and
        responsive to receiving from a user a request to present messages about the story:
            identify a perspective of the user;
            using the at least one fact of the story described in messages expressing an opinion about the story that matches the perspective of the user, generate a summary of the story; and
            present the summary to the user.

2. The method of claim 1, the instructions further configured to, for respective messages, identify at least one entity involved in the message by:
    identifying respective tokens of the message;
    identifying, for respective tokens, an entity referenced by the token.

3. The method of claim 1, the instructions further configured to generate a summary of the story by:
    for respective messages of the message cluster:
        identify at least one sentence;
        for the tokens of respective sentences:
            identify a speech part, and
            identify at least one fact from the speech parts of the sentence; and
    using at least one facts identified in several messages of the message cluster, generating a summary from the facts of several messages of the message cluster.

4. The method of claim 1, the instructions further configured to, for respective messages, identify a language of the message.

5. The method of claim 4, the instructions further configured to:
identify at least one slang phrase of the message according to the language of the message; and
translate the slang phrase into at least one token of the message.

6. The method of claim 4:
the message processing pipeline defining a target language; and
the instructions further configured to, upon identifying a source language of a message that is different than the target language, translate the message from the source language to the target language.

7. The method of claim 4:
the device comprising a multilingual component comprising:
a first language subcomponent configured to process messages in a first language, and
a second language subcomponent configured to process messages in a second language that is different than the first language; and
the instructions further configured to, upon identifying the language of the message, invoke a language subcomponent of the multilingual component configured to process messages in the language of the message.

8. The method of claim 1, the instructions further configured to, for respective entities identified by the entity extraction component:
identify at least one ambiguous reference of a message identifying one of at least two possible entities; and
among the possible entities, identify the entity identified by the ambiguous reference of the message.

9. The method of claim 1, the instructions further configured to, for respective messages:
identify at least one reference to an associated message, and
import the at least one associated message into the message.

10. The method of claim 1:
respective messages generated by a message source; and
the instructions configured to, for respective message sources generating at least one message, identify a message source perspective of the message source according to the story perspectives of the stories of the messages generated by the message source.

11. The method of claim 1, the instructions further configured to, for respective stories:
for respective entities involved in the summary, classify the entity according to an entity type; and
generate a meta-summary classifying the story according to the entity types of the entities involved in the summary.

12. The method of claim 1, the instructions further configured to, upon receiving a custom component to be inserted into the message processing pipeline, insert the custom component into the message processing pipeline.

13. The method of claim 1, the instructions further configured to:
store, for respective stories:
a summary, and
at least one message associated with the story; and
upon receiving a request to present stories:
retrieve at least one summary of at least one story, and
present the at least one summary of the at least one story in response to the request; and
upon receiving a selection of a selected story, present at least one message associated with the selected story in response to the request.

14. The method of claim 13, the instructions further configured to, upon receiving the request to present stories:
for respective stories, retrieve at least one media object involving at least one entity involved in the story; and
present with respective summaries, present the at least one media object.

15. The method of claim 13, the instructions further configured to, upon receiving a request to present at least one story involving a selected entity:
retrieve at least one summary of at least one story involving the selected entity, and
present the at least one summary of the at least one story in response to the request.

16. The method of claim 1, extracting the at least one fact of the story form the at least one expression further comprising:
from the expression, identify at least one token representing an entity of the story; and
extract a combination of the tokens of the expression as the fact of the story.

17. The method of claim 1, wherein identifying the perspective of the user further comprises: receiving a request from the user to present the summary of the news story from a selected perspective.

18. The method of claim 1, wherein:
the instructions further comprise: for respective opinions, identifying a vocabulary of messages expressing the opinion; and
identifying the at least two opinions about the story further comprises:
for the respective messages of the message cluster, matching the message to the vocabulary of a selected opinion; and
identifying the selected opinion as the opinion of the message.

19. A message processing pipeline configured to generate summaries of stories respectively associated with at least one message on a device having a memory and a processor, the message processing pipeline comprising:
an entity extraction component comprising instructions stored in the memory that, when executed on the processor, cause the device to, for respective messages, identify at least one entity involved in the message;
a message clustering component comprising instructions stored in the memory that, when executed on the processor, cause the device to cluster the messages according to the at least one entity identified in the respective messages to identify, for a story, a message cluster comprising at least two messages that individually present the story; and
a summary generating component comprising instructions stored in the memory that, when executed on the processor, cause the device to:
using the messages of the message cluster, identify at least one expression that frequently appears in the messages of the message cluster;
distinguish fact expressions from the respective messages of the message cluster that provide a fact about the story from opinion expressions that express an opinion about the story;
from the fact expressions of the messages and excluding the opinion expressions, extract at least one fact of the story; and
using the at least one fact of the story, generate a summary of the story.

20. A computer-readable storage device comprising instructions that, when executed on a processor of a device, cause the device to generate summaries of stories respectively associated with at least one message, by:
    for respective messages, identifying at least one entity involved in the message;
    cluster the messages according to the at least one entity identified in the respective messages to identify, for a story, a message cluster comprising at least two messages that individually present the story;
    using the messages of the message cluster, identifying at least one expression that frequently appears in the messages of the message cluster;
    distinguish fact expressions from the respective messages of the message cluster that provide a fact about the story from opinion expressions that express an opinion about the story;
    from the fact expressions of the messages and excluding the opinion expressions, extract at least one fact of the story; and
    using the at least one fact of the story, generating a summary of the story.

\* \* \* \* \*